United States Patent [19]

Zank

[11] Patent Number: 5,169,908
[45] Date of Patent: Dec. 8, 1992

[54] CURABLE BORON MODIFIED HYDROPOLYSILAZANE POLYMERS

[75] Inventor: Gregg A. Zank, Midland, Mich.

[73] Assignee: Dow Corning Corporation, Midland, Mich.

[21] Appl. No.: 810,972

[22] Filed: Dec. 20, 1991

[51] Int. Cl.$^5$ .............................................. C08E 283/00
[52] U.S. Cl. ....................................... 525/474; 528/4; 528/31; 528/32; 528/34; 528/38
[58] Field of Search ...................... 525/474; 528/4, 38, 528/31, 32, 34

[56] References Cited

U.S. PATENT DOCUMENTS

| | | | |
|---|---|---|---|
| 4,540,803 | 9/1985 | Cannady | 556/412 |
| 4,910,173 | 3/1990 | Niebylski | 501/97 |
| 5,030,744 | 7/1991 | Funayama et al. | 556/402 |

FOREIGN PATENT DOCUMENTS 364323  4/1990  European Pat. Off. .

OTHER PUBLICATIONS

Seyferth et al., J. Am. Ceram. Soc. 73 2131–2133 (1990).

*Primary Examiner*—Melvyn I. Marquis
*Attorney, Agent, or Firm*—Roger E. Gobrogge

[57] ABSTRACT

The present invention relates to a method of preparing boron modified hydropolysilazane' polymers. The method comprises reacting a hydropolysilazane polymer with borane for a time sufficient to form the boron modified hydropolysilazane polymer. The invention also relates to the novel polymers produced by the above process.

9 Claims, No Drawings

CURABLE BORON MODIFIED HYDROPOLYSILAZANE POLYMERS

BACKGROUND OF THE INVENTION

The present invention relates to a method of preparing boron modified hydropolysilazane polymers. The method comprises reacting a hydropolysilazane polymer with borane for a time sufficient to produce the desired polymer. This invention also relates to the novel polymers produced by the above process.

A variety of polysilazane oligomers, cyclics, resins and linear polymers are known in the art. Generally, such polymers are characterized as having backbones with alternating silicon and nitrogen atoms. Cannady, in U.S. Pat. No. 4,540,803 issued Sep. 10, 1985, described a novel class of silazane polymers (hydropolysilazanes) having a three-dimensional structure formed by the presence of HSiN$_3$ and R$_3$SiNH groups. This unique structure afforded such polymers physical properties which are desirable in the formation of various ceramic materials.

Boron modified polysilazane polymers and various methods for their preparation are also known in the art. For instance, U.S. Pat. No. 5,030,744 granted to Funayama et al. describes the formation of boron modified polysilazanes by reacting a polysilazane having repeating units comprising:

with a boron compound. The polysilazanes described in this reference, however, differ from those claimed in the present invention in that those of the reference are primarily linear or cyclic whereas those of the present application are the highly branched, three-dimensional polymers of Cannady, supra. Moreover, the boron is used in the reference to crosslink the polysilazanes and thereby increase their molecular weight whereas borane is used in the present application to merely add a BH$_2$ group to the hydropolysilazane polymer.

Likewise, European Patent No. 364.323. U.S. Pat. No. 4,910,173 granted to Niebylski and Seyferth et al., J. Am. Ceram. Soc. 73, 2131–2133 (1990), describe various other methods of forming boron modified polysilazane polymers. These references teach reacting a polysilazane with a trihalogen borane, a boroxine or a borane, respectively. As with the Funayama patent described above, however, these references do not describe the polysilazanes of the present invention.

Therefore, what has not been described in the prior art is use of borane to modify the specific polymers claimed herein. The present inventor has discovered that such polymers have properties superior to those known in the art.

SUMMARY OF THE INVENTION

The present invention relates to a method of forming a boron modified hydropolysilazane polymer. The method comprises reacting a R$_3$SiNH-containing hydropolysilazane polymer with borane for a time sufficient to form the boron modified hydropolysilazane polymer. The R$_3$SiNH-containing hydropolysilazane polymer used in this invention is formed by a process consisting of contacting and reacting, in an inert, essentially anhydrous atmosphere, trichlorosilane with a disilazane at a temperature in the range of 25° to 300° C. while distilling by-produced volatile products, wherein said disilazane has the general formula (R$_3$Si)$_2$NH where R is selected from the group consisting of vinyl, hydrogen, phenyl, and alkyl radicals containing 1 to 3 carbon atoms.

The present invention also relates to the novel polymers produced by this process.

DETAILED DESCRIPTION OF THE INVENTION

The present invention is based on the discovery that borane can be used to modify the hydropolysilazane polymers claimed herein to form their boron modified derivatives. The method whereby this reaction occurs can be described as follows:

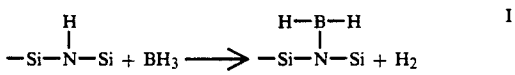

This reaction was unexpected since it was not known whether the highly resinous, branched polymers of the invention could be modified in the above manner (due to issues such as steric hindrance) without destroying their structure. Moreover, it was unexpected that this reaction would occur without an appreciable increase in molecular weight of the polymer. This indicates that crosslinking of the polymer did not occur.

The hydropolysilazane polymers useful herein are those described in U.S. Pat. No. 4,540,803, granted to Cannady 9/10/85, and incorporated herein by reference. These polymers are prepared by a method which comprises contacting and reacting in an inert essentially anhydrous atmosphere, trichlorosilane with a disilazane at a temperature in the range of 25° C. to 300° C. while distilling volatile byproducts. The disilazane used in the process has the formula (R$_3$Si)$_2$NH where R is selected from the group consisting of vinyl, hydrogen, phenyl and alkyl radicals containing 1 to 3 carbon atoms.

The trichlorosilane is treated with sufficient disilazane to react with all of the chlorine in the trichlorosilane. This is usually an equimolar amount based on the chlorine content of the trichlorosilane. i.e., 3 moles of disilazane per mole of trichlorosilane.

The disilazane used in the Cannady invention has the formula (R$_3$Si)$_2$NH, where R is vinyl, hydrogen, an alkyl group of 1–3 carbon atoms or a phenyl group. Thus, the R groups are independently selected from the group consisting of hydrogen, methyl, ethyl, propyl, vinyl and phenyl. Examples of suitable disilazanes include [(CH$_3$)$_3$Si]$_2$NH, [C$_6$H$_5$(CH$_3$)$_2$Si]$_2$NH, [(C$_6$H$_5$)$_2$CH$_3$Si]$_2$NH, [CH$_2$=CH(CH$_3$)$_2$Si]$_2$NH, [CH$_2$=CH(CH$_3$)C$_6$H$_5$Si]$_2$NH, [CH$_2$=CH(C$_6$H$_5$)$_2$Si]$_2$NH, [CH$_2$=CH(C$_2$H$_5$)$_2$Si]$_2$NH, [H(CH$_3$)$_2$Si]$_2$NH, and [CH$_2$=CH(C$_6$H$_5$)C$_2$H$_5$Si]$_2$NH.

An especially preferred embodiment of the Cannady invention involves the reaction of trichlorosilane with hexamethyldisilazane. The polymer produced thereby, trimethylsilyl hydropolysilazane, has been shown to have valuable preceramic properties.

The above reactants are brought together in an inert, essentially anhydrous atmosphere. By inert it is meant that the reaction is carried out under a blanket of inert gas such as argon, nitrogen or helium. What is meant by essentially anhydrous is that the reaction is preferably carried out in an absolutely anhydrous atmosphere but minute amounts of moisture can be tolerated.

When the reactants are contacted with each other an intermediate amino compound is formed. It is preferred that the reactants are brought together in such a manner to keep the initial reaction exotherm to a minimum. Upon continued heating additional amino compound is formed and, with further heating. R₃SiCl is distilled from the reaction mixture and the silazane polymer formed. For best results, the rate of heating should be controlled at a rate of less than about 1° C./min A heating rate of about 0 5° C./min. or less is preferred. As the temperature of reaction is raised, more condensation takes place and branching occurs with residual R₃Si— that is not distilled from the mixture acting as a chain stopper. This control allows one to stop the reaction at any point to obtain almost any desired viscosity. The desired temperature range for the reaction is 25° C. to 300° C. with a temperature in the range of 125° C. to 275° C. being more preferred. The length of time that the reaction requires depends on the temperature employed and the polymer viscosity one wishes to achieve.

After the above polymer is formed, it is reacted with borane to produce the desired boron modified hydropolysilazane polymer. Generally, any source of borane may be used in the present invention. Such sources are well known in the art and readily available commercially. For instance, borane is available from Aldrich Chemical Co. as complexes with various lewis bases. These include borane complexes with various amines such as pyridine, butylamine or diethylamine, complexes with sulfides such as methyl sulfide, complexes with phosphines such as triphenylphosphine and complexes with ethers such as tetrahydrofuran. Though any source of borane may be used, the present inventor has found it convenient to use the boranetetrahydrofuran complex.

The amount of borane used in this reaction is generally an amount greater than about 0.01 equivalent borane per 100 g hydropolysilazane polymer. Although large excesses may be used, an amount in the range of from about 0.01 to about 1 equivalent borane per 100 g hydropolysilazane polymer are usually used. Amounts in the range of from about 0.05 to about 0.5 equivalents borane per 100 g hydropolysilazane polymer are preferred.

The reaction of the hydropolysilazane polymer with the borane is generally conducted in a solvent to facilitate the reaction. The solvents which may be used herein include any which act as a solvent for the borane complex, the hydropolysilazane polymer and the boron modified hydropolysilazane polymer without adversely affecting any of the species. Examples of such solvents include alkanes such as pentane, hexane, heptane, octane etc., ethers such as tetrahydrofuran, or aromatic hydrocarbons such as benzene, toluene, xylene etc. Generally, if the boranetetrahydrofuran complex is used in the reaction it is convenient to use tetrahydrofuran or mixtures with aromatic hydrocarbons as the solvent.

The reaction of the hydropolysilazane and borane is conducted by merely mixing the polymer and the borane in a suitable reaction vessel. This reaction can be performed at any suitable temperature or pressure and in any convenient atmosphere. For simplicity, however, it is generally run at room temperature under an inert atmosphere and at atmospheric pressure. Since an exotherm generally occurs when the hydropolysilazane and the borane are mixed, it is often preferred to control the exotherm by slowly adding the borane to a solution of the polymer. Continued stirring of this mixture (e.g., for 1–24 hours) results in formation of the desired polymer.

The boron modified hydropolysilazane polymer produced by the above reaction is then merely recovered from solution. Numerous methods such as simple evaporation or stripping of the solvent under heat and/or vacuum are known in the art and useful herein.

The resultant polymers formed by the above process are similar to the precursor polymers except for the boron bound to the nitrogen. Thus, the boron modified hydropolysilazane polymers have similar polymeric characteristics such as molecular weight, Tg, and solubility as the precursor polymers with the added advantages that the boron provides (i.e., infusibility). Modification of the polymers has been confirmed by IR data which shows new absorbances (when compared with the hydropolysilazane) at 2400 and 1350 cm$^{-1}$ which can be assigned to B—H and B—N respectively.

The methods of this invention are especially valuable for rendering the polymers easily infusible. Such infusibility is critical in applications such as ceramic matrix composites and, as such, the polymers have found particular utility in these areas. The method of infusibilizing the polymers herein generally involves merely heating the polymer to a temperature above about 100° C. The following reaction occurs:

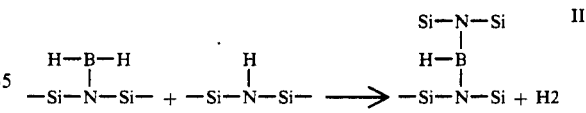

This reaction has been confirmed by IR data which show disappearance of the band at 2400cm$^{-1}$ (B—H) and increased intensity of the band at 1350cm$^{-1}$ (B—N).

The following non-limiting examples are provided so that one skilled in the art may more readily understand the invention.

In the following Examples, FTIR data were recorded on a Perkin Elmer series 1600 spectrometer; gel permeation chromatography (GPC) data were obtained on a Waters GPC equipped with a model 600E system controller, a model 490 UV and model 410 Differential Refractometer detectors (all values relative to polystyrene); TMA data were recorded on a Du Pont 940 thermomechanical analyzer (TMA); DSC data were recorded on a DuPont 910 differential scanning calorimeter (DSC); TGA data were recorded on a DuPont thermogravimetric analyzer (TGA) all interfaced to an IBM PS/2 model 50Z computer; carbon, hydrogen and nitrogen analysis were performed on a Control Equipment Corporation 240-XA Elemental Analyzer; boron and silicon were determined by a fusion technique which consisted of converting the silicon and boron materials to soluble forms of silicon and boron and analyzing the solute for total silicon and boron by atomic absorption spectrometry; all furnace firings were done in an Astro graphite furnace equipped with Eurotherm temperature controllers. The furnace was equipped with an Ircon Modeline Plus optical pyrometer to monitor temperatures above 900° C.

EXAMPLES 1-3

A 3 L three necked flask fitted with an Ar inlet, an overhead stirrer, and an addition funnel was charged with 1500 g of a 50% solids solution of trimethylsilyl hydropolysilazane polymer (i.e., 750 g polymer) in toluene under argon (the hydropolysilazane polymer was made by the method of Example 1 in U.S. Pat. No. 4,540,803). The addition funnel was charged with 450 mL of 1.0M $BH_3$-tetrahydrofuran complex (obtained from Aldrich Chemical Co.). The borane solution was added to the hydropolysilazane solution over 2 hours which resulted in a mild exotherm and gas evolution. The resulting solution was stirred for 16 hours and then stripped of volatiles at 60° C. in vacuo. A brittle solid resulted. Two more samples of polymer were prepared in the same manner as above. Characterization of these polymers is presented in Table 1.

TABLE 1

| | Characterization of Products from Examples 1-3 | | | | | | | | |
|---|---|---|---|---|---|---|---|---|---|
| | | | GPC | | Char | | | | |
| Ex | TGA[1] | DSC[2] | Mn | Mw | Yield[3] | % C | % N | % Si | % B |
| HPZ[4] | 61.7 | >190 | 2240 | 18647 | 65.79 | 12.01 | 25.52 | 59.2 | 0.0 |
| 1 | 76.6 | 95-110 | 1554 | 20097 | 77.15 | 12.08 | 18.76 | 50.2 | 1.4 |
| 2 | — | 95-110 | 4446 | 19621 | 76.46 | 11.60 | 21.54 | 58.6 | 1.4 |
| 3 | 77.0 | — | — | — | 71.20 | 12.88 | 27.23 | 63.0 | 1.3 |

[1]TGA experiment run to 1000° C. under argon
[2]temperature region of exotherm related to cure
[3]char yield at 1400° C. under argon
[4]unmodified hydropolysilazane polymer

EXAMPLE 4-8

A 5 L three-necked flask fitted with an Ar inlet, an overhead stirrer, and an addition funnel was charged with 400 g of toluene and 1760 g of a 60% solids solution of trimethylsilyl hydropolysilazane polymer (i.e., 1060 g polymer) in toluene under argon (the hydropolysilazane polymer was made by the method of Example 1 in U.S. Pat. No. 4,540,803). The addition funnel was charged with 1600 mL of 1.0M $BH_3$-tetrahydrofuran complex (obtained from Aldrich Chemical Co.). Various amounts of the borane solution (as indicated in Table 2) were added to the hydropolysilazane solution over 4 hours resulting in mild exotherms and gas evolution. The resulting solution was stirred for 16 hours and then stripped of volatiles at 60° C. in vacuo. A brittle solid resulted.

The above Example was repeated using varying ratios of borane/hydropolysilazane. Characterization of these polymers is presented in Table 2.

That which is claimed is:

1. A method of forming a boron modified hydropolysilazane polymer comprising:
reacting a $R_3SiNH$-containing hydropolysilazane polymer with borane for a time sufficient to form the boron modified hydropolysilazane polymer, wherein the $R_3SiNH$-containing hydropolysilazane polymer is formed by a process consisting of contacting and reacting, in an inert, essentially anhydrous atmosphere, trichlorosilane with a disilazane at a temperature in the range of 25° to 300° C. while distilling by-produced volatile products, wherein said disilazane has the general formula $(R_3Si)_2NH$ where R is selected from the group consisting of vinyl, hydrogen, phenyl, and alkyl radicals containing 1 to 3 carbon atoms.

2. The method of claim 1 wherein the disilazane is hexamethyldisilazane.

3. The method of claim 1 wherein the borane is in the form of a borane-lewis base complex.

4. The method of claim 3 wherein the borane is in the form of borane-tetrahydrofuran complex.

5. The method of claim 1 wherein the amount of borane used in this reaction is in the range of from about 0.01 to about 1 equivalent borane per 100 g hydropolysilazane polymer.

6. The method of claim 5 wherein the amount of borane used in this reaction is in the range of from about 0.05 to about 0.5 equivalent borane per 100 g hydropolysilazane polymer.

7. The method of claim 1 wherein the reaction of the hydropolysilazane polymer with the borane is conducted in a solvent selected from the group consisting of alkanes, ethers, and aromatic hydrocarbons.

8. The boron modified hydropolysilazane polymer produced by the process of claim 1.

9. The boron modified hydropolysilazane polymer produced by the process of claim 2.

* * * * *

TABLE 2

| | Characterization of Materials from Examples 4-8 | | | | | | | | |
|---|---|---|---|---|---|---|---|---|---|
| | $BH_3$ | Tg | GPC | | Char | | | | |
| Ex | Equiv[1] | (°C.) | Mn | Mw | Yield[2] | % C | % N | % Si | % B |
| HPZ[3] | 0.0 | 19.7 | 1603 | 4294 | 58.6 | 11.81 | 28.0 | 53.7 | — |
| 4 | 0.075 | 15.6 | 1877 | 7579 | 60.5 | 11.11 | 26.1 | 53.6 | 1.0 |
| 5 | 0.15 | 45.4 | 1625 | 4389 | 67.0 | 11.9 | 25.0 | 51.1 | 2.3 |
| 6 | 0.135 | 23.6 | — | — | 60.4 | 11.27 | 27.2 | 56.1 | 1.8 |
| 7 | 0.275 | 60.9 | 1680 | 4068 | 73.5 | 13.81 | 25.21 | 47.8 | 5.2 |
| 8[4] | 0.135 | 30.7 | 2166 | 8931 | 65.5 | 12.02 | 27.80 | 54.4 | 2.6 |

[1]expressed as equivalents $BH_3$/100 g hydropolysilazane polymer
[2]heated to 1400° C. under argon
[3]hydropolysilazane
[4]$BH_3$—$SMe_2$ used in place of $BH_3$-THF